No. 731,585. Patented June 23, 1903.

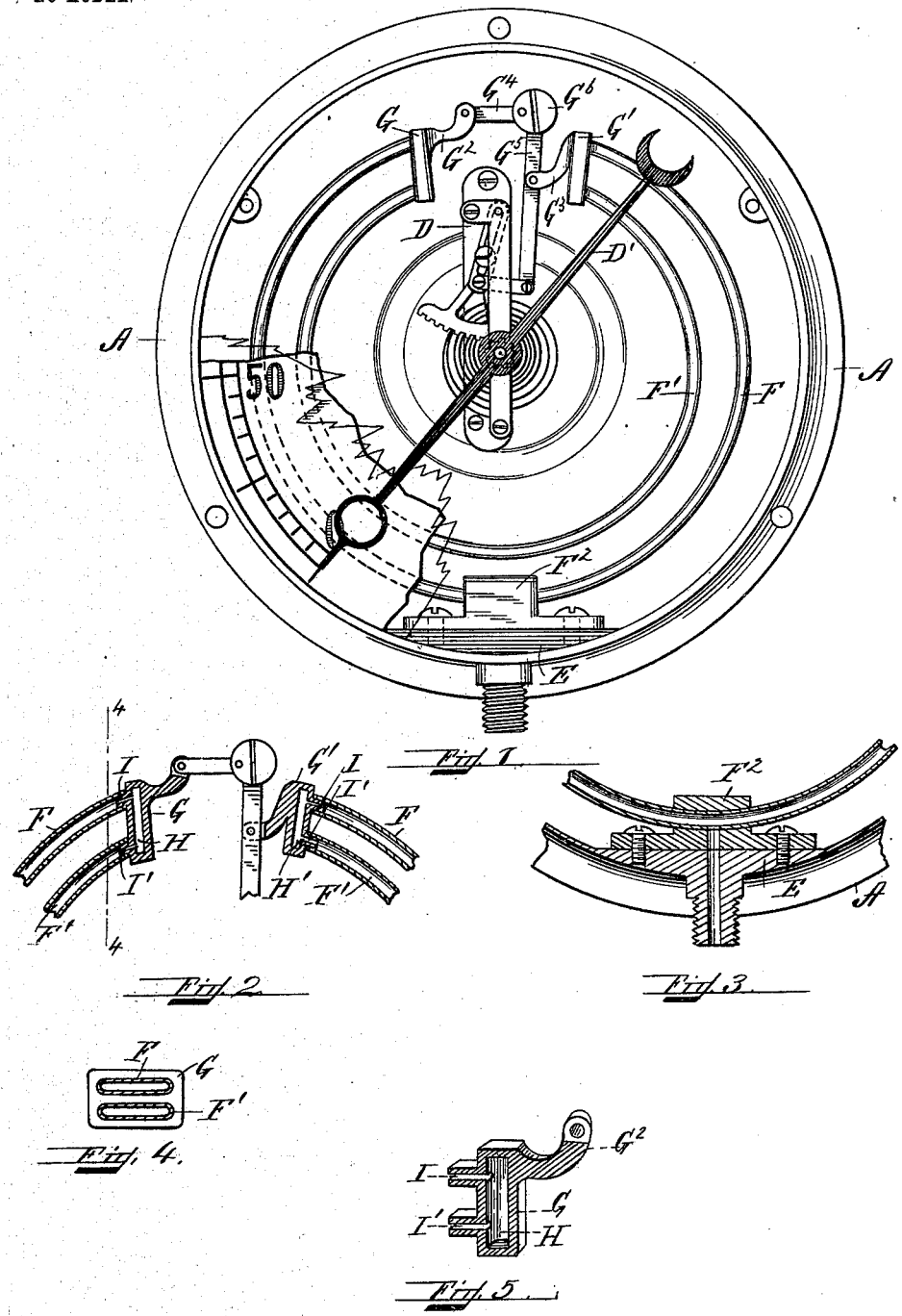

UNITED STATES PATENT OFFICE.

COLEMAN J. MANNING, OF MEDFORD, MASSACHUSETTS.

PRESSURE-GAGE.

SPECIFICATION forming part of Letters Patent No. 731,585, dated June 23, 1903.

Application filed February 5, 1903. Serial No. 141,965. (No model.)

*To all whom it may concern:*

Be it known that I, COLEMAN J. MANNING, a citizen of the United States, residing in the city of Medford, in the county of Middlesex and State of Massachusetts, have invented a new and useful Improvement in Pressure-Gages, of which the following is a specification.

My invention relates to pressure-gages for steam-boilers and analogous uses, and is an improvement upon such gages as employ the "Bourdon" tubular spring for actuating the indicating mechanism; and the object of the invention is to make such spring-action more reliable and is attained by the construction hereinafter fully described, and illustrated in the accompanying drawings, in which—

Figure 1 is a plan of the interior of a pressure-gage embodying my improvement, showing also the index and a small portion of the dial. Fig. 2 is a section of the free ends of the Bourdon tubular springs shown in Fig. 1 and plan of a portion of the connecting devices. Fig. 3 is a section of the socket or steam-inlet and a portion of the tubular spring attached thereto. Fig. 4 is a cross-section of the tubular springs, taken as on line 4 4, Fig. 2; and Fig. 5 is a perspective of one of the couplings for uniting the ends of the springs.

The principal parts comprised in the pressure-gage, as illustrated, consist of the case A, dial B, (only partly shown,) index D', group of mechanism D, called the "index movement," the socket or inlet E, and two Bourdon tubular springs, which serve to actuate the index and of which the primary one, F, is firmly attached to the socket of the inlet-pipe, and the secondary one, F', is coupled to the free ends of the tube F by coupling connections G and G', as shown in Figs. 1 and 2.

The group of mechanism comprising the index-movement attached to the central portion of the casing and marked D contains in and by itself no part of any present invention, which is confined to the double-spring arrangement and construction which actuates the index D' through said movement and can and will be fully explained without going into a detailed description of said movement D.

The gage illustrated in Fig. 1 is of the kind known as a "steam-pressure" gage. Such gages as hitherto constructed have employed only a single Bourdon spring. In their practical use in connection with locomotive-boilers they are subject to extremes of heat and cold and to much jarring, which deranges them and makes them often unreliable in their indications of steam-pressure, and, furthermore, being firmly held, as in the case of the present spring F, in a rigid connection with the socket of the steam-inlet pipe, as at $F^2$, Fig. 1, a considerable portion of the vibratory elasticity of the spring is thereby rendered inoperative, so that the spring is liable to become "set," and thus impairs the actuating vibration of its ends and render its indications variable and unreliable. This is a serious defect in such gages as employ but one Bourdon spring, and much effort has been made to overcome it by various devices, but without success. I have now, after much experimenting and study of the problem, discovered that by the employment of an additional tubular spring F', open to the inlet of steam through the outer spring F and confined only by the movable coupling connections G and G', by which its ends are joined to the ends of spring F, leaving its elasticity perfect freedom of action from end to end of the spring, that it reinforces the primary spring and overcomes the objection above referred to. The couplings G and G' have interior channels H and H', which communicate with the interiors of the tubular springs through holes I and I' in the ribs which are inserted in the ends of the springs, as shown in Fig. 2. The steam passes through inlet E into the primary spring F at $F^2$ and thence in both directions to and through the couplings G and G' into the seconday spring F', thus operating with equal pressure on both springs, so both springs are vibrated in unison and equally, and by the greater freedom of vibration of the secondary spring F' it has no tendency to become set, such as the confined primary spring F has, and consequently aids the latter in overcoming its tendency to set, for the reasons already explained, and causes perfect action of the index through the mechanism D and gives correct indications of the pressure at all times, and this secondary spring F' also stops the tremulous or fluctuating vibration which the primary spring F has when used alone in a gage employed on a locomotive and which causes a vibratory agitation of the index that confuses the reading of the dial indications. The spring F' being unrestrained at all points except at its ends, as before stated, counteracts to some extent the vibratory action of the primary spring, and thus produces a steady vibratory movement of the two springs, according to the varying pressure, and so prevents the confusing fluctuations of the index referred to. Another very desirable feature in this double-spring gage consists in the fact that under the arrangement and construction shown the secondary spring and the vertical channels in the couplings G fill with the condensation of steam and maintain a constant body of water therein, which will not drain out and which protects the solder from being melted and carried away by superheated steam, causing leakage, as frequently occurs in single-tube gages so employed, and such presence of water in and open communication between springs F' and F has advantages in extreme cold in preventing the bursting of pipes by freezing.

The couplings G and G' have arms $G^2$ and $G^3$, the outer ends of which are respectively pivoted to links $G^4$ and $G^5$, which are united in a movable head $G^6$, not directly attached to the case and connected through link $G^5$ to the index movement D, as shown, and through which mechanism the vibratory motion of the springs is imparted to the index D' in the well-known manner.

I claim—

1. In a pressure-gage, the combination of two Bourdon springs for actuating the index movement, both ends of the primary spring being free to vibrate, while the body is open and intermediately secured to the inlet device; and the secondary spring having its ends coupled with the ends of the primary spring, and being supported thereby; all substantially as and for the purposes specified.

2. In a pressure-gage, the combination of two Bourdon springs for actuating the index movement, both ends of the primary spring being free to vibrate, while the body is open and intermediately secured to the inlet device; and the secondary spring having its ends coupled with the ends of the primary spring, and so arranged in relation thereto that the spring and couplings will fill with water from condensation of the steam, and contain the same; all substantially as specified.

3. In a pressure-gage, the combination of two tubular springs arranged with their four ends free to actuate an index mechanism, and having their vibratory ends united by couplings having internal channels through which the steam passes from one tube to the other, substantially as specified.

COLEMAN J. MANNING.

Witnesses:
MAXWELL T. SMITH,
EUGENE HUMPHREY.